United States Patent
Camenisch

(10) Patent No.: US 7,490,069 B2
(45) Date of Patent: Feb. 10, 2009

(54) ANONYMOUS PAYMENT WITH A VERIFICATION POSSIBILITY BY A DEFINED PARTY

(75) Inventor: Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 10/448,098

(22) Filed: May 29, 2003

(65) Prior Publication Data

US 2005/0010535 A1 Jan. 13, 2005

(30) Foreign Application Priority Data

May 30, 2002 (EP) .................... 02405432

(51) Int. Cl.
*H04K 1/00* (2006.01)
*H04L 9/00* (2006.01)

(52) U.S. Cl. .............................. 705/74; 705/79; 713/180
(58) Field of Classification Search ................. 705/74, 705/50–79; 713/180

See application file for complete search history.

(56) References Cited

U.S. PATENT DOCUMENTS

| 4,748,668 | A | * | 5/1988 | Shamir et al. | .............. 380/30 |
| 5,214,702 | A | * | 5/1993 | Fischer | .................. 380/30 |
| 5,373,558 | A | * | 12/1994 | Chaum | .................. 713/180 |
| 5,943,424 | A | * | 8/1999 | Berger et al. | ............. 705/64 |
| 6,154,841 | A | * | 11/2000 | Oishi | ..................... 713/180 |
| 7,181,017 | B1 | * | 2/2007 | Nagel et al. | ............. 380/282 |
| 7,225,156 | B2 | * | 5/2007 | Fisher et al. | ............. 705/50 |
| 7,360,080 | B2 | * | 4/2008 | Camnisch et al. | ............. 713/156 |
| 2001/0029496 | A1 | * | 10/2001 | Otto et al. | ............. 705/74 |
| 2004/0133782 | A1 | * | 7/2004 | Sander et al. | ............. 713/170 |
| 2005/0065799 | A1 | * | 3/2005 | Dare et al. | ............. 705/1 |

FOREIGN PATENT DOCUMENTS

JP 2001-188757 7/2001

OTHER PUBLICATIONS

Macgregor, Rob et al., Secure Electronic Transactions: Credit Card Payment on the Web in Theory and Practice, Jun. 1997, IBM, http://www.redbooks.ibm.com/redbooks/pdfs/sg244978.pdf.*

(Continued)

*Primary Examiner*—Andrew J. Fischer
*Assistant Examiner*—Jamie Kucab
(74) *Attorney, Agent, or Firm*—Stephen C. Kaufman, Esq.; McGinn IP Law Group, PLLC

(57) ABSTRACT

The present invention relates to a method for verifying an anonymous payment by a defined party in a communication system providing a public key infrastructure. The method comprising the steps of (a) receiving a validation message from a merchant party, the validation message comprising a proof signature produced by a customer party and an encrypted payment message, the proof signature being derived from a customer secret key, a customer certificate, at least one customer attribute, and the encrypted payment message; (b) verifying the validity of the proof signature based on an issuing public key, a verification public key, and the encrypted payment message; (c) decrypting at least part of the encrypted payment message based on a verification secret key corresponding to the verification public key, thereby obtaining a customer information related to the at least one customer attribute. In the event of the validity of the proof signature (d) the obtained customer information is used for initializing the authorization of the payment.

14 Claims, 2 Drawing Sheets

OTHER PUBLICATIONS

Gleick. A New Approach to Protecting Secrets is Discovered. The New York Times, Feb. 17, 1987 [online], [retrieved on Sep. 8, 2008]. Retrieved from the Internet: <http://query.nytimes.com/gst/fullpage.html?res=9B0DE2D9173AF934A25751C0A961948260>.*

Gustavus et al. Zero-Knowledge Proofs of Identity and Veracity of Transaction Receipts. Springer-Verlag, 1988 [online], [retrieved on Sep. 8, 2008]. Retrieved from the Internet: <http://www.springerlink.com.content.82dbec4d3mmga4a4/fulltext.pdf>.*

Ford and Baum. Secure Electronic Commerce. New Jersey, Prentice Hall PTR, 1997. pp. 173-175. QA76.9.A25F655.*

Isao Taniguch, "Introduction to Visual Technologies, Digest of Cryptography Technology", Nippon Jitsugyo Publishing Co., Sep. 30, 2000, pp. 128-131.

Zenji Katagata, "E-Commerc System Technology", Fujitec Corporation, May 16 2001, First Edition, pp. 251-253, 810, and 819-823.

* cited by examiner

ANONYMOUS PAYMENT WITH A VERIFICATION POSSIBILITY BY A DEFINED PARTY

FIELD OF THE INVENTION

The present invention relates to the field of computing, it specifically concerns a method and a technical implementation for secure data exchange over a computer network. More particularly, the present invention relates to a method for verifying an anonymous payment by a defined party. The present invention relates also to a method for verifying a payment message by a merchant party.

BACKGROUND OF THE INVENTION

Electronic commerce involves the use of the Internet and proprietary networks to facilitate business-to-business, consumer, and auction sales of everything imaginable, from computers and electronics to books, recordings, automobiles, and real estate. In such an environment consumer privacy is becoming a major concern although payments should be fulfilled. Credit card payment schemes have been developed and are employed to facilitate secure payment card transactions over the Internet. An open technical standard is called SET—Secure Electronic Transaction. Digital certificates create a trust chain throughout the transaction, verifying cardholder and merchant validity, a process unparalleled by other Internet security solutions. Merchants, financial institutions, and many customers believe in such payment schemes.

In SET, first, a cardholder, a merchant, and an acquirer exchange their public keys and the certificates on them and then verify these certificates. Then, the cardholder and the merchant exchange data to specify the purchase. From this data the cardholder then forms two messages $m_O$ and $m_P$, where $m_O$ contains the transaction id, the order description, and the purchase amount and $m_P$ contains the transaction id, the purchase amount, merchant id, credit card number $\#_C$, and expiration date $t_C$. Then, the cardholder signs $h_O$, $h_P$ resulting in $sig_C$, where $h_O=H(m_O)$, $h_P=H(m_P)$, and H is a one-way hash function, and encrypts $m_P$ under the acquirer's public key resulting in $e_A$. Then the cardholder sends $m_O$, $sig_C$, $h_P$, and $e_A$ together with a cardholders public key and certificate to the merchant. The merchant computes $h_O=H(m_O)$ and checks whether $sig_C$ is a valid signature on ($h_O$, $h_P$) with respect the cardholder public key. Then the merchant forwards the public key and certificate of the cardholder and sends $e_A$, $h_O$, $sig_C$, and some other (merchant related) details to the acquirer. The acquirer decrypts $e_A$, computes $h_P=H(m_P)$ and checks whether $sig_C$ is a valid signature on $h_O$, $h_P$ with respect the cardholder public key. The acquirer also checks whether $H(\#_C)$ and $H(t_C)$ are contained in the cardholder's certificate. Then, the acquirer uses $\#_C$, $t_C$, and the purchase amount to get authorization for the purchase via a financial network. The acquirer notifies the merchant of the outcome, who notices the cardholder. If the outcome was successful, then the acquirer arranges that the merchant gets paid and the merchant delivers the goods or services to the cardholder, i.e., the customer.

However, current credit card payment schemes, like SET or iKP (Internet Keyed Payment Protocol), do not offer anonymity for a cardholder towards the merchant. This means that credit card transactions are not anonymous, i.e., the merchant gets to know the customer's name, the credit card number, and expiration date. Moreover, often this knowledge is sufficient to impersonate the customer and use the credit card illegitimately. Although in SET the merchant does not necessarily see the cardholder's name, he sees her public key and the certificate on it, i.e., the cardholder is known to the merchant under a pseudonym. If the customer uses the same pseudonym with different merchants or transaction, these transactions can be linked and a profile can be established. Such a profile is usually sufficient to identity a customer. Also, if a customer is requested to provide her/his name in one transaction, this name "propagates" to the other transactions. This problem could be solved, if the cardholder creates a new public key and get a new certificate for each transaction she/he does. However, this is not very efficient. Therefore, a system is desired that allows the cardholder to use her/his public key and the certificate on it unlimited times without that the transactions become linkable.

Due to the use of traditional financial networks to authorize payments, as does SET, the scheme does also not offer anonymity for the cardholder with respect to an acquirer.

To overcome the drawbacks, a scheme is required that allows the cardholder to remain anonymous to all parties apart from the card-issuer. The card-issuer should know the cardholder's identity in order to bill accordingly. However, all the parties should get convinced that the cardholder or customer has a valid credit card and that the payment is valid.

SUMMARY OF THE INVENTION

In accordance with the present invention, there is provided a method for verifying an anonymous payment by a defined party in a communication system providing a public key infrastructure. The method comprising the steps of receiving a validation message from a merchant party, the validation message comprising a proof signature produced by a customer party and an encrypted payment message, the proof signature being derived from a customer secret key, a customer certificate, at least one customer attribute, and the encrypted payment message; verifying the validity of the proof signature based on an issuing public key, a verification public key, and the encrypted payment message; decrypting at least part of the encrypted payment message based on a verification secret key corresponding to the verification public key, thereby obtaining a customer information related to the at least one customer attribute. In the event of the validity of the proof signature the obtained customer information is used for initializing the authorization of the payment.

Further, there is provided a method for verifying a payment message by a merchant party in a communication system providing a public key infrastructure, the verification arising out of a payment message being sent and received between a customer party and the merchant party. The method comprising the steps of receiving the payment message from the customer party, the payment message comprising a proof signature produced by the customer party and an encrypted payment message, the proof signature being derived from a customer secret key, a customer certificate, at least one customer attribute, and the encrypted payment message; and verifying the validity of the proof signature based on an issuing public key, a verification public key, and the encrypted payment message.

In case of the validity of the proof signature the validation message can be formed by the merchant party and sent to the defined party, also referred to as verification party or issuing party. The verification and issuing party can form a single party.

The presented methods show the advantage that an efficient anonymity within a payment system can be provided, whereby it is possible to perform multiple payments and transactions without the possibility to link them together.

There is no need for a registration for each new transaction. It is advantageous that the customer party, who is a cardholder, never reveals a certificate or public key but can convince the merchant and verification party that she owns them. Also, it is possible to convince the verification party that the credit card number and expiration date provided are encoded into the certificate.

The at least one customer attribute can comprise a card number, an expiration date, or any other customer related information.

The encrypted payment message can be derived from the at least one customer attribute and the verification public key. In view of the latter, the merchant party can rely on the message and information sent by the customer party to the verification party. Moreover, the encrypted payment message can comprise multiple encrypted payment messages. Then it is possible to separate the information to the merchant party, the verification party, and an issuing party, which issues the customer certificate comprising the customer attribute and bills the customer party. That means only intended or defined information are available for a respective party. For example, the merchant party gets the expiration date but not the credit card number. In another example, the verification party gets only part of the information and the remaining part is only known to the issuing party, which authorizes the payment. In view of the verification party, total anonymity can be achieved.

The customer certificate can comprise a certificate signature on a certificate message. The certificate signature can be generated by the issuing party using an issuing secret key that corresponds to the issuing public key. The certificate message can then easily be derived from a customer public key and the at least one customer attribute. This allows a high level on authenticity.

The message, i.e. the payment message and/or the validation message, can comprise a proof signature and an encrypted payment message. The proof signature can be derived from a customer secret key, a customer certificate, at least one customer attribute, and the encrypted payment message. In principal, the same message can be used by different parties for different purposes, whereby the relevant information is only accessible by the party that should have the information.

The methods in accordance with the present invention can be used in a communication system providing a public key infrastructure. That is a system of public key encryption and signature schemes using digital certificates from certificate authorities and other registration authorities that verify and authenticate the validity of each party involved in an electronic transaction. The certificate authority, also called "Trusted Third Party", is an entity, typically a company, that issues digital certificates to other entities like organizations or individuals to allow them to prove their identity to others and to securely communicate. The certificate authority might be an external company that offers digital certificate services or it might be an internal organization such as a corporate MIS (Management Information System) department. The Certificate Authority's chief function is to verify the identity of entities and issue digital certificates attesting to that identity.

In a public key encryption scheme, each party gets a pair of keys, called the public key and the private key. Each person's public key is published while the private key is kept secret. Messages are encrypted using the intended recipient's public key and can only be decrypted using his private key. This mechanism can also be used for or in conjunction with a digital signature.

The digital signature is formed by extra data appended to a message which identifies and authenticates the sender and message data using public-key encryption. The sender uses a one-way hash function to generate a hash-code of, for example, 160 bits from the message data. He then signs the hash-code with his private key. The receiver computes the hash-code from the data as well and verifies the received hash with the sender's public key.

The need for sender and receiver to share secret information, e.g., keys, via some secure channel is eliminated, since all communications involve only public keys, and no private key is ever transmitted or shared. Public-key schemes can be used for authentication, confidentiality, integrity and non-repudiation. RSA is an example of a public-key cryptography system.

The one-way hash function, also called "message digest function", used for the digital signature is a function which takes a variable-length message and produces a fixed-length hash. Given the hash it is computationally impossible to find a message with that hash. In fact, one cannot determine any usable information about a message with that hash, not even a single bit. For some one-way hash functions it is also computationally impossible to determine two messages which produce the same hash. A one-way hash function can be private or public, just like an encryption function. A public one-way hash function can be used to speed up a public-key digital signature system. Rather than signing a long message which can take a long time, the one-way hash of the message is computed, and the hash is digitally signed.

BRIEF DESCRIPTION OF THE DRAWINGS

Preferred embodiments of the invention are described in detail below, by way of example only, with reference to the following schematic drawings.

DETAILED DESCRIPTION OF PREFERRED EMBODIMENTS OF THE INVENTION

Figure 1:
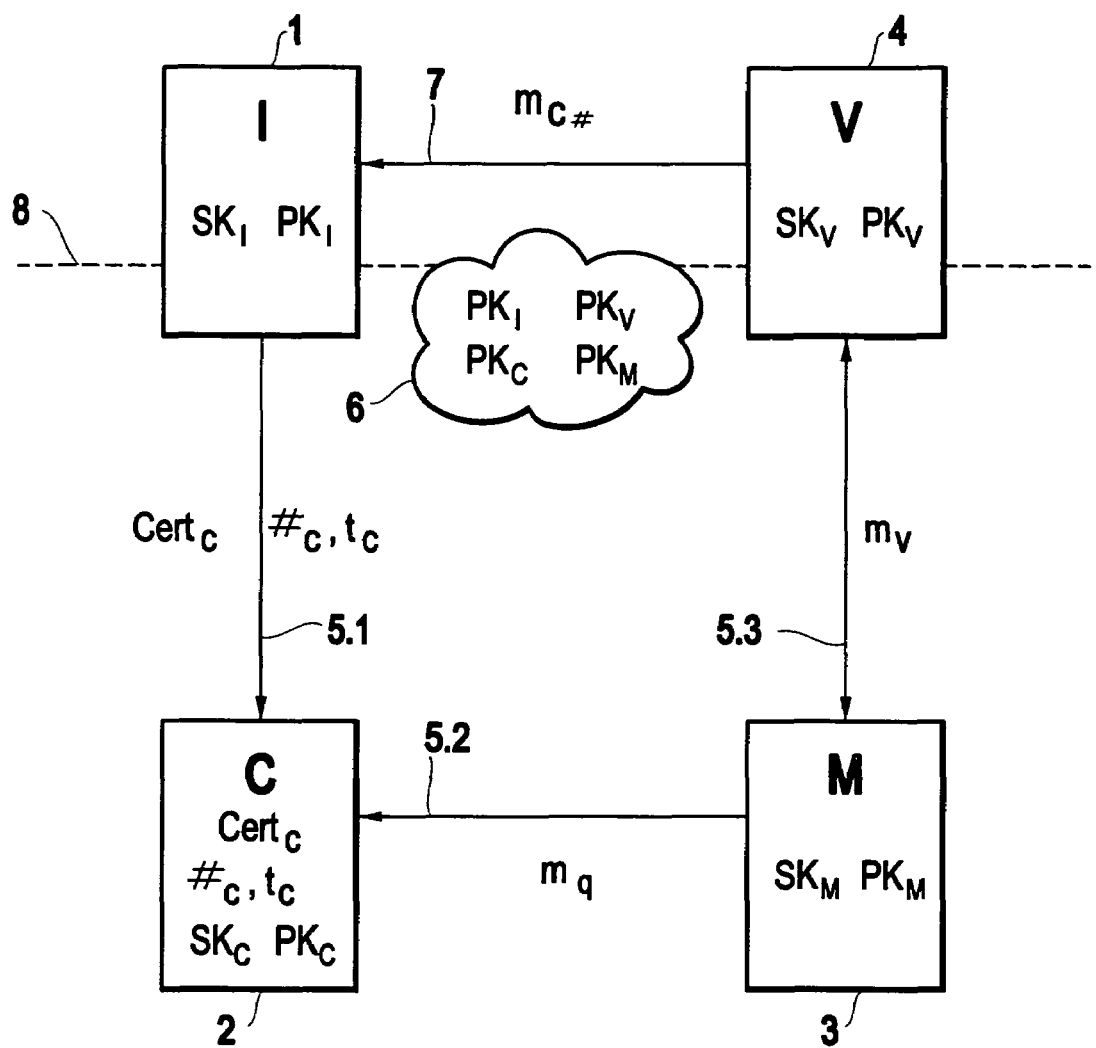
FIG. 1 shows a schematic illustration of possible involved parties.

With reference to FIG. 1, the general layout of a communication environment is described in which the invention can be used. In the figures, same reference numerals or letters are used to denote the same or like parts. An issuing party 1, also labeled with I, is connected via a first connection means 5.1 to a customer party 2, also labeled with C. The customer party 2 has a connection via a second connection means 5.2 to a merchant party 3, also labeled with M. The merchant party 3 has a connection via a third connection means 5.3 to a validation party 4, also labeled with V. The validation party 4 has a fourth connection means 7, which usually is a financial network, to the issuing party 1, that is a bank or credit card issuer. The financial network 7 is separated from the connection means 5.1, 5.2, 5.3, as indicated by the dotted line 8. The connection means 5.1, 5.2, 5.3 are communication connections as they are known in the art and are provided, for example, by the Internet. The issuing party 1 has an issuing secret key $SK_I$ with a corresponding issuing public key $PK_I$, the customer party 2 a customer secret key $SK_C$ with a corresponding customer public key $PK_C$, the merchant party 3 a merchant secret key $SK_M$ with a corresponding merchant public key $PK_M$, and the validation party 4 a validation secret key $SK_V$ with a corresponding validation public key $PK_V$, as indicated in the boxes 1 to 4, respectively. The respective secret key SK is only known to its respective party 1, 2, 3, 4. Each party 1, 2, 3, 4 provides its public key $PK_I$, $PK_C$, $PK_M$, $PK_V$ to the public domain as it is indicated with cloud 6. In praxis, the issuing party 1 generates a customer certificate $Cert_C$ comprising a customer attribute, e.g. a card number $\#_C$ and expiration date $t_C$. The card number $\#_C$ is associated with a customer and is used to bill accordingly. The customer certificate $Cert_C$ customer and the attribute $\#_C$, $t_C$ are sent from the issuing party 1 to the customer party 2, as indicated on the first connection means 5.1. The customer attribute $\#_C$, $t_C$ and the customer certificate $Cert_C$ are stored by the customer party 2. The word certificate is also contemplated as an electronic receipt, a credential, or a license.

The customer certificate $Cert_C$ comprises a certificate signature on a certificate message, wherein the certificate signature was generated by the issuing party 1 using the issuing secret key $SK_I$ that corresponds to the issuing public key $PK_I$, and the certificate message is derived from the customer public key $PK_C$ and the at least one customer attribute $\#_C$, $t_C$.

When the customer party 2 has agreed with the merchant party 3 on a price for a service or some goods, the customer party 2 uses the customer certificate $Cert_C$ together with the customer secret key $SK_C$, at least one customer attribute $\#_C$, $t_C$, and an encrypted payment message $e_V$ to generate a proof signature $sig_C$. With the proof signature $sig_C$ together with the encrypted payment message $e_V$ the customer party 2 generates then a payment message $m_q$. The payment message $m_q$ is sent from the customer party 2 to the merchant party 3, who then can verify the validity of the proof signature $sig_C$ as described with reference to FIG. 2 in more detail. The merchant party 3 sends a verification message $m_V$ to the validation party 4, which is adapted to derive from the encrypted payment message $e_V$ a customer information $INFO_C$. From the customer information $INFO_C$ an obtained customer information $INFO_{\#C, tc}$ can be derived by the validation party 4. The customer information $INFO_C$ or obtained customer information $INFO_{\#c, tc}$ is then used within an initializing message $m_{C\#}$ to initialize the authentication of the payment. The payment message $m_q$ and the verification message $m_V$ can be identical but can also be modified by the merchant party 3 with additional information or information can be omitted. The validation party 4 sends via the financial network 7 an authentication message $m_{\#c}$ to the issuing party 1. This authentication message $m_{\#c}$ initializes the payment. The validation party 4 can also form together with the issuing party 1 a single party, with the advantage of an easier structure for the payment. The merchant party 3 will also be informed about the authentication of the payment.

The general layout of the communication environment is shown to facilitate the description of the following figures. Within the following FIGS. 2 to 4, the exchange of messages and in particular their relevant content with a verification is indicated above or below the respective arrows.

Figure 2:
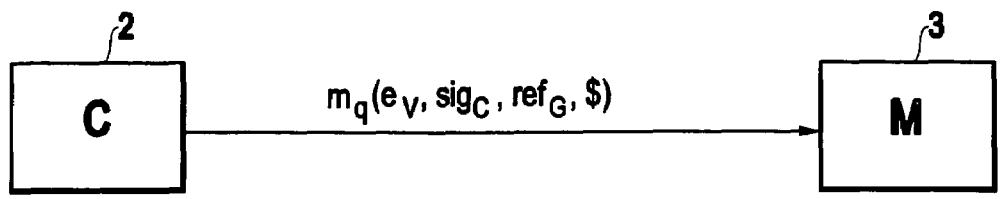
FIG. 2 indicates an message exchange between a customer and a merchant party comprising a payment message.

Turning now to FIG. 2, in which a schematic illustration shows a message exchange between the customer party 2 and the merchant party 3. The merchant party 3 receives the payment message $m_q$ from the customer party 2. The payment message $m_q$ can be verified by the merchant party 3 and comprises the encrypted payment message $e_V$ and the proof signature $sig_C$. Moreover, the payment message $m_q$ further comprise a reference $ref_G$ to goods or services to be purchased and an amount \$ thereof. The payment message $m_q$ is indicated here with $m_q(e_V, sig_C, ref_G, \$)$. The proof signature $sig_C$ has been produced by the customer party 2 and derived from the customer secret key $SK_C$, the customer certificate $Cert_C$, the at least one customer attribute $\#_C$, and the encrypted payment message $e_V$. Moreover, the customer public key $PK_C$ has also been used here for deriving the proof signature $sig_C$. The merchant party 3 verifies the validity of the proof signature $sig_C$ with respect to the issuing public key $PK_I$, the verification public key $PK_V$, and the encrypted payment message $e_V$. More precisely, the proof signature $sig_C$ is based on a zero-knowledge proof and is here expressed with $sig_C$=Proof-sig($SK_C$, $Cert_C$, $\#_C$, $PK_C$:

$-e_V$=enc$_{PK_V}$($\#_C$)

$-PK_C$=f$SK_C$)

$-Cert_C$=sig$_{PK1}$($PK_C$, $\#_C$, ... )) {\$}.

The values of customer secret key $SK_C$, the customer certificate $Cert_C$, the customer attribute $\#_C$, and the customer public key $PK_C$ are the secret inputs of the customer party 2. The proof shows that the customer party 2 knows these values for which the three statements $e_V$=enc$_{PK_V}$($\#_C$), $PK_c$=f($SK_C$), and $Cert_C$=sig$_{PK1}$($PK_C$, $\#_C$, ... ) hold.

The expression $e_V$=enc$_{PK_V}$($\#_C$) symbolizes that the encrypted payment message $e_V$ is an encryption of the at least one customer attribute $\#_C$ under use of the validation public key $PK_V$.

The expression $PK_C$=f($SK_C$) symbolizes that the public customer key $PK_C$ is derived as a function f of the secret customer key $SK_C$. The function f is a general one and can be chosen ad libitum.

The expression $Cert_C$=sig$_{PK1}$($PK_C$, $\#_C$, ... ) symbolizes that the customer certificate $Cert_C$ is a signature produced by the issuing party 1 using the issuing secret key $SK_I$ that corresponds to the issuing public key $PK_I$, and the signed message, above also referred to as certificate message, is derived from the customer public key $PK_C$ and the at least one customer attribute $\#_C$.

The expression above further indicates that the proof signature $sig_C$ is also the signature on the amount \$, denoted as {\$}. In a further embodiment, the amount \$ can comprise as well as other relevant information, e.g. reference $ref_G$.

Figure 3:
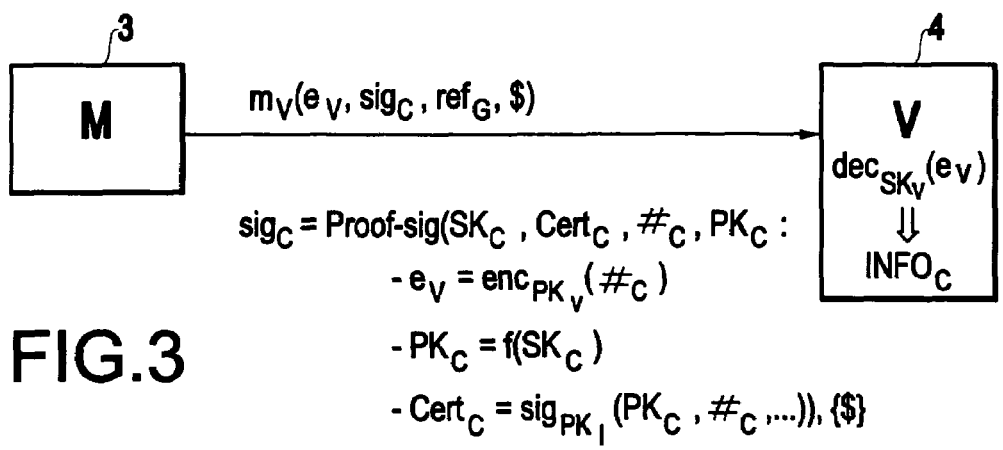
FIG. 3 indicates an message exchange between the merchant and a verification party comprising a validation message.

FIG. 3 shows a schematic illustration of a message exchange between the merchant party 3 and the validation party 4. The validation party 4 receives the validation message $m_V$ from the merchant party 3. The validation message $m_V$ can be verified by the validation party 4 and comprises the encrypted payment message $e_V$, the proof signature $sig_C$, and the amount \$, as indicated with $m_V(e_V, sig_C, \$)$. The reference $ref_G$ to goods or services to be purchased has been omitted by the merchant party 3 as this is not relevant for the further processing parties 4, 1. As mentioned above, the proof signature $sig_C$ has been produced by the customer party 2 and derived from the customer secret key $SK_C$, the customer certificate $Cert_C$, the at least one customer attribute $\#_C$, and the encrypted payment message $e_V$. Moreover, the customer public key $PK_C$ has also been used here for deriving the proof signature $sig_C$. The validation party 4 verifies the validity of the proof signature $sig_C$ with respect to the issuing public key $PK_I$, the verification public key $PK_V$, and the encrypted payment message $e_V$.

The proof signature $sig_C$ is expressed as shown and described with reference to FIG. 2. Further, as indicated in box 4, at least part of the encrypted payment message $e_V$ is decrypted under use of the verification secret key $SK_V$ corresponding to the verification public key $PK_V$. Thereby a customer information $INFO_C$ is obtained that relates to the at least one customer attribute $\#_C$. When the validation party 4 has verified the validity of the proof signature $sig_C$, then authentication of the payment can be given.

Figure 4:
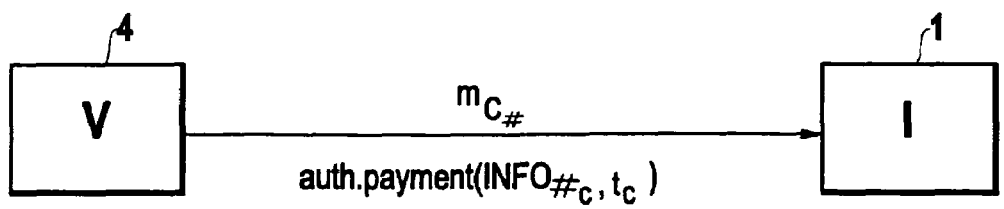
FIG. 4 shows a schematic illustration of an authentication of a payment. The drawings are provided for illustrative purpose only and do not necessarily represent practical examples of the present invention to scale.

FIG. 4 shows a schematic illustration of the authentication of the payment. The validation party 4 sends the initializing message $m_{C\#}$ to the issuing party 1. The initializing message $m_{C\#}$ comprises the obtained customer information $INFO_{\#c}$, whereby the initializing message $m_{C\#}$ finally initializes the authentication of the payment. Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computerized method for verifying an anonymous payment by a defined party in a communication system providing a public key infrastructure, the method comprising:
receiving a validation message from a merchant party via an input port of a computer, the validation message comprising a proof signature produced by a customer party and an encrypted payment message, the proof signature being derived from a zero-knowledge proof 1) of knowledge of a customer secret key, a customer certificate, and at least one customer attribute, 2) that the encrypted payment message encrypts said customer attribute, and 3) that said customer certificate is valid and is related to said customer secret key, thereby allowing said customer secret key, said customer certificate, and said at least one customer attribute to remain anonymous to said merchant party;
verifying, by said computer, a validity of the proof signature based on an issuing public key, a verification public key, and the encrypted payment message;
decrypting, by said computer, at least part of the encrypted payment message based on a verification secret key corresponding to the verification public key, thereby obtaining a customer information related to the at least one customer attribute; and
in an event of the validity of the proof signature, the computer using the obtained customer information for initializing an authentication of the payment, and, in an event the proof siginature is not valid, the computer provides an indication that the proof siginature was not valid.

2. The method according to claim 1, wherein the encrypted payment message is derived from the at least one customer attribute and the verification public key.

3. The method according to claim 1, wherein the encrypted payment message comprises multiple encrypted payment messages.

4. The method according to claim 1, wherein the customer certificate comprises a certificate signature on a certificate message, the certificate signature being generated by an issuing party using an issuing secret key corresponding to the issuing public key, the certificate message being derived from a customer public key and the at least one customer attribute.

5. The method according to claim 1, wherein the at least one customer attribute comprises a card number.

6. The method according to claim 1, wherein the at least one customer attribute comprises an expiration date.

7. A program storage device readable by machine, tangibly embodying a program of instructions executable by the machine to perform a method for verifying an anonymous payment by a defined party in a communication system providing a public key infrastructure, the method comprising:
receiving a validation message from a merchant party, the validation message comprising a proof signature produced by a customer party and an encrypted payment message, the proof signature being derived from a zero-knowledge proof 1) of knowledge of a customer secret key, a customer certificate, and at least one customer attribute, 2) that the encrypted payment message encrypts said customer attribute, and 3) that said customer certificate is valid and is related to said customer secret key, thereby allowing said customer secret key, said customer certificate, and said at least one customer attribute to remain anonymous to said merchant party;
verifying a validity of the proof signature based on an issuing public key, a verification public key, and the encrypted payment message;
decrypting at least part of the encrypted payment message based on a verification secret key corresponding to the verification public key, thereby obtaining a customer information related to the at least one customer attribute; and
in an event of the validity of the proof signature, using the obtained customer information for initializing the authentication of the payment, and, in an event the proof signature is not valid, providing an indication that the proof signature was not valid.

8. The program storage device according to claim 7, wherein the encrypted payment message is derived from the at least one customer attribute and the verification public key.

9. The program storage device according to claim 7, wherein the encrypted payment message comprises multiple encrypted payment messages.

10. The program storage device according to claim 7, wherein the customer certificate comprises a certificate signature on a certificate message, the certificate signature being generated by an issuing party using an issuing secret key corresponding to the issuing public key, the certificate message being derived from a customer public key and the at least one customer attribute.

11. The program storage device according to claim 7, wherein the at least one customer attribute comprises a card number.

12. The program storage device according to claim 7, wherein the at least one customer attribute comprises an expiration date.

13. The method of claim 1, wherein said defined person executing said verifying comprises a validation party and said authentication of the payment is executed by an issuing party and said validation party and said issuing party are isolated from said customer party and said merchant party, each of said validation party, said issuing party, said customer party, and said merchant party having respective secret keys and respective public keys.

14. The method of claim 13, wherein said validation party and said issuing party comprise a combined entity.

* * * * *